United States Patent
Schieke et al.

(10) Patent No.: US 12,358,063 B2
(45) Date of Patent: Jul. 15, 2025

(54) PEELING WHEEL AND METHOD FOR MANUFACTURING A TOOTHING ON A GEAR WHEEL BY SKIVING

(71) Applicant: Präwema Antriebstechnik GmbH, Eschwege/Werra (DE)

(72) Inventors: Jörg Schieke, Erfurt-Marbach (DE); Walter Holderbein, Eschwege (DE)

(73) Assignee: Präwema Antriebstechnik GmbH, Eschwege/Werra (DE)

( * ) Notice: Subject to any disclaimer, the term of this patent is extended or adjusted under 35 U.S.C. 154(b) by 97 days.

(21) Appl. No.: 17/766,808

(22) PCT Filed: Sep. 11, 2020

(86) PCT No.: PCT/EP2020/075505
§ 371 (c)(1),
(2) Date: Apr. 6, 2022

(87) PCT Pub. No.: WO2021/069176
PCT Pub. Date: Apr. 15, 2021

(65) Prior Publication Data
US 2024/0066616 A1    Feb. 29, 2024

(30) Foreign Application Priority Data
Oct. 7, 2019    (DE) ..................... 10 2019 126 870.2

(51) Int. Cl.
*B23F 5/16*    (2006.01)
*B23F 21/10*    (2006.01)

(52) U.S. Cl.
CPC .............. *B23F 5/163* (2013.01); *B23F 21/10* (2013.01); *Y10T 409/105247* (2015.01); *Y10T 409/105883* (2015.01); *Y10T 409/10795* (2015.01)

(58) Field of Classification Search
CPC ...... B23F 1/04; B23F 5/12; B23F 5/16; B23F 5/163; B23F 21/10; Y10T 407/1735;
(Continued)

(56) References Cited

U.S. PATENT DOCUMENTS 2,228,968 A * 1/1941 Miller ................... B23F 21/286
407/31
8,950,301 B2 2/2015 Marx et al.
(Continued)

FOREIGN PATENT DOCUMENTS

CN    201922134 U    8/2011
DE    19933137 A1 *    1/2000    .............. B23F 19/00
(Continued)

OTHER PUBLICATIONS

EPO Machine Translation of CN201922134U—Ye Zhi-jun; "Special Pinion Cutter"; Aug. 10, 2011.*
(Continued)

Primary Examiner — Sunil K Singh
Assistant Examiner — Michael Vitale
(74) Attorney, Agent, or Firm — The Webb Law Firm

(57) ABSTRACT

The invention relates to a peeling wheel for manufacturing a toothing on a gear wheel by skiving. The peeling wheel includes a toothing, which is formed by a plurality of equally shaped cutting teeth arranged and distributed around the rotational axis of the peeling wheel at a first pitch and at least one deviating cutting tooth, whose shape is different from the shape of the equally shaped cutting teeth. The cutting teeth include cutting edges with which they come into chip removing engagement with the material of the gear wheel during the skiving processing.

In order to be able to produce toothings with such a peeling wheel with increased freedom in the design, the invention proposes that the deviating cutting tooth is arranged outside of the first pitch (p).

(Continued)

The invention also relates to a method for producing a toothing on a gear wheel by skiving using a peeling wheel.

4 Claims, 4 Drawing Sheets

(58) Field of Classification Search
CPC ........... Y10T 407/174; Y10T 407/1745; Y10T 409/105088; Y10T 409/105247; Y10T 409/105724; Y10T 409/105883; Y10T 409/107632; Y10T 409/107791; Y10T 409/10795
USPC ........ 409/33, 34, 37, 38, 49, 50, 51; 407/27, 407/28, 29
See application file for complete search history.

(56) References Cited

U.S. PATENT DOCUMENTS

| | | |
|---|---|---|
| 9,327,357 B2 | 5/2016 | Nagata |
| 9,539,659 B2 | 1/2017 | Otani et al. |
| 9,782,847 B2 | 10/2017 | Otani et al. |
| 2012/0148360 A1* | 6/2012 | Heinemann ............. B23F 5/163 409/12 |
| 2018/0036813 A1* | 2/2018 | Zimmermann ......... B23F 21/10 |
| 2019/0054554 A1* | 2/2019 | Sobczyk ............... B23F 17/006 |

FOREIGN PATENT DOCUMENTS

| | | |
|---|---|---|
| DE | 102007015357 A1 | 10/2008 |
| DE | 102015106354 A1 | 6/2016 |
| EP | 2520391 B1 | 1/2018 |
| EP | 3263262 A1 | 1/2018 |
| JP | 201251049 A | 3/2012 |

OTHER PUBLICATIONS

EPO Machine Translation of DE 102015106354 A1—Zimmermann, J.; "Method for Toothing Movement Wheel, Involves Propelling Movement Wheel and Cutting Tool to Each Other"; Jun. 16, 2016.*

* cited by examiner

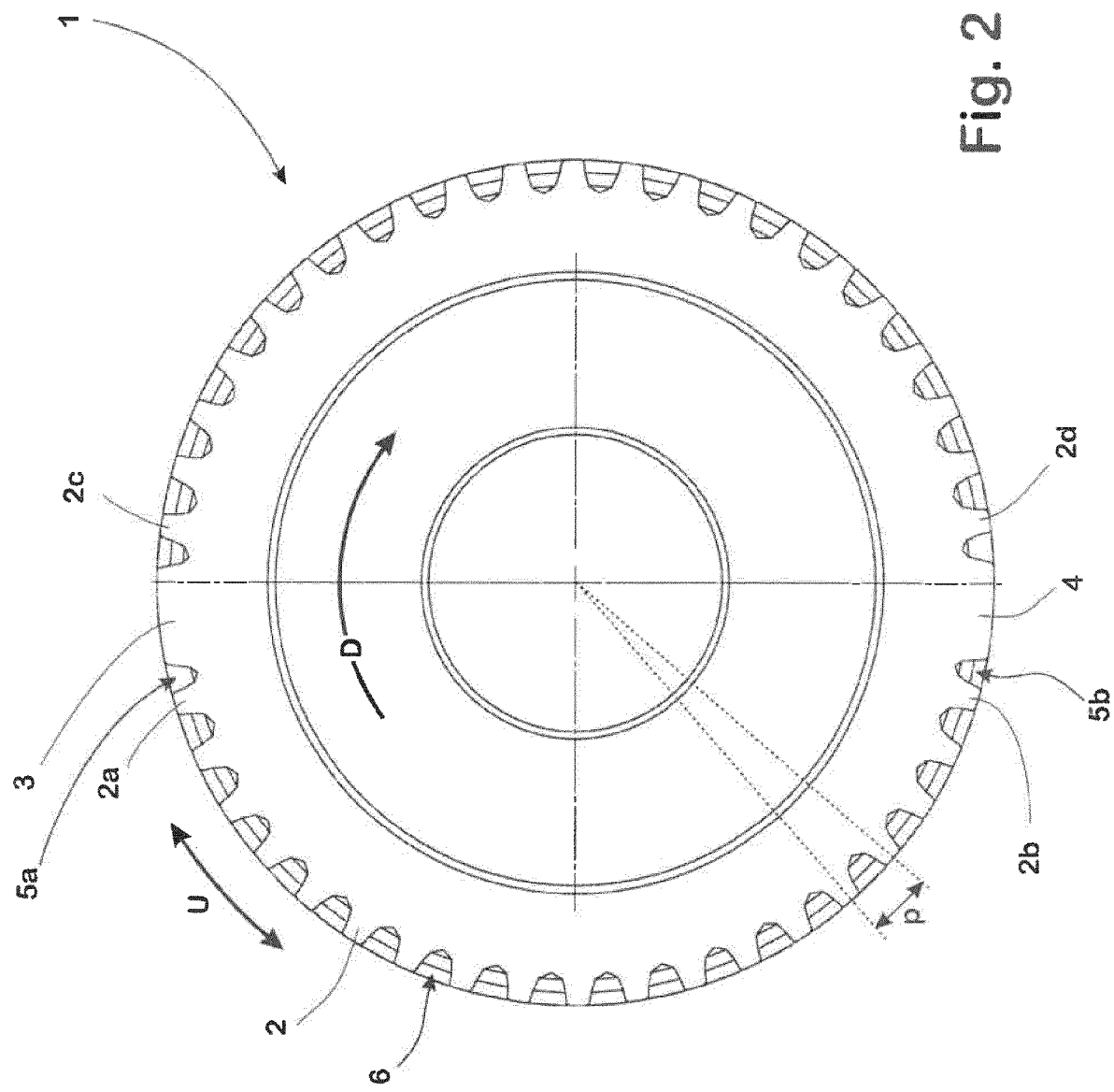

PEELING WHEEL AND METHOD FOR MANUFACTURING A TOOTHING ON A GEAR WHEEL BY SKIVING

CROSS-REFERENCE TO RELATED APPLICATIONS

This application is the United States national phase of International Application No. PCT/EP2020/075505 filed Sep. 11, 2020, and claims priority to German Patent Application No. 10 2019 126 870.2 filed Oct. 7, 2019, the disclosures of which are hereby incorporated by reference in their entirety.

BACKGROUND OF THE INVENTION

Field of the Invention

The invention relates to a peeling wheel for manufacturing a toothing on a gear wheel by skiving. The peeling wheel comprises a toothing which is formed by a plurality of equally shaped cutting teeth arranged and distributed around the rotational axis of the peeling wheel at a first pitch and at least one deviating cutting tooth.

Description of Related Art

The term "deviating cutting teeth" is used here to describe such cutting teeth whose shape differs from the shape of the other cutting teeth of the peeling wheel. These other cutting teeth each have the same shape. In this way, the deviating cutting teeth form other form elements on the toothing of the gear wheel to be processed, which toothing is to be produced with the peeling wheel, than the "normal" equally shaped cutting teeth of the peeling wheel.

The cutting teeth of the peeling wheel each comprise cutting edges with which they come into chip removing engagement with the material of the gear wheel during the skiving processing.

Furthermore, the invention relates to a method for manufacturing a toothing on a gear wheel by skiving. In such a method, a gear wheel blank to be toothed is driven in a rotating manner about a workpiece rotational axis and a peeling wheel is driven in a rotating manner about a peeling wheel rotational axis, wherein the workpiece rotational axis and the peeling wheel rotational axis are aligned at an axis cross angle. The peeling wheel is thereby brought into engagement with the gear wheel blank such that the cutting teeth of the peeling wheel, with their cutting edges, remove material of the gear wheel blank.

Such a tool and such a method are known from EP 2 440 357 B1. The device described in this patent specification for toothing gear wheels by skiving comprises a workpiece spindle for receiving the gear wheel to be toothed, which workpiece spindle is driven in a rotating manner by a rotary drive about a workpiece rotational axis, and a tool spindle also driven in a rotating manner by a rotary drive about a tool rotational axis. Said tool spindle carries a peeling wheel which comprises cutting teeth with a regular pitch by means of which the tooth distance of the toothing of the gear wheel is determined, wherein the distance of at least some adjacent equally shaped teeth of the peeling wheel corresponds to a multiple of the regular tooth pitch. In this context, "adjacent equally shaped teeth" are also understood to mean teeth which have the same shape and are arranged consecutively in the circumferential direction of the gear wheel, but between which may be present a differently shaped tooth or an empty space occupying the place of a tooth. With such a tool, gear wheels can be formed in which there is a tooth gap between at least two adjacent teeth that is larger than the tooth gaps between the other teeth of the gear wheel.

The "first pitch" is defined as the distance between the centre lines running through the centre of the adjacent teeth of the respective toothing: $p = \pi \times d / z$, where p denotes the pitch and d denotes the diameter of the toothing of the peeling wheel.

SUMMARY OF THE INVENTION

Against the background of the prior art explained above, the object has emerged to indicate a peeling wheel and method for manufacturing a toothing on a gear wheel, which enable increased freedom in the design of toothings, in which a gap exceeding the first pitch is provided between individual adjacent teeth, while at the same time ensuring optimum efficiency of manufacture.

The invention has achieved this object by a peeling wheel having the features as described herein.

A method according to the invention, which achieves the above-mentioned object, is described herein.

Advantageous embodiments of the invention are indicated in the dependent claims and, like the general idea of the invention, are explained in detail in the following.

In accordance with the prior art explained at the outset, a peeling wheel according to the invention for manufacturing a toothing on a gear wheel by skiving thus comprises a toothing, which is formed by a plurality of cutting teeth of equal shape arranged and distributed around the rotational axis of the peeling wheel at a first pitch and at least one deviating cutting tooth, whose shape is different from the shape of the other cutting teeth, and wherein the cutting teeth comprise cutting edges with which they come into chip removing engagement with the material of the gear wheel during the skiving processing. According to the invention, in such a peeling wheel, the deviating cutting tooth is now arranged outside of the first pitch.

In the case of a method according to the invention for manufacturing a toothing on a gear wheel by skiving, a gear wheel blank to be toothed is driven in a rotating manner about a workpiece rotational axis and a peeling wheel according to the invention is driven in a rotating manner about a peeling wheel rotational axis, which are aligned at an axis cross angle with respect to the workpiece rotational axis, and the peeling wheel is brought into engagement with the gear wheel blank such that the cutting teeth of the peeling wheel, with their cutting edges, remove material of the gear wheel blank.

In the case of a peeling wheel according to the invention, the equally shaped cutting teeth thus define a first pitch, i.e. the regular distance at which the equally shaped teeth are arranged distributed around the rotational axis of the peeling wheel, as in the case of the prior art acknowledged at the outset.

In contrast to the prior art described at the outset, in which the deviating cutting teeth are each placed in the place of one of the equally shaped teeth of the peeling wheel without thereby leaving the first pitch, in the case of a peeling wheel according to the invention however, the at least one deviating cutting tooth is arranged offset with respect to the first pitch. This offset arrangement of the deviating cutting tooth, which arrangement is shifted with respect to the first pitch, makes it possible, with greater design freedom, to also reproduce form elements on the gear wheel to be manufactured which are located outside of the pitch reproduced on the gear wheel by the equally shaped cutting teeth or extend over a circumferential length which is greater than a first pitch.

In this way, with peeling wheels and methods according to the invention, gear wheels provided with an internal toothing can for example be manufactured in which so-called "index pockets" are formed in the toothing distributed at regular angular distances around the rotational axis of the gear wheel. Such gear wheels, also known as "sliding sleeves" in technical language, are used in manual transmissions for motor vehicles in order to synchronise the rotational speed of the gear wheels of the transmission which engage with one another during a gearshift (see for example DE 10 2015 201 708 A1).

An embodiment of the invention, which is particularly suitable for this purpose, provides that the thickness of the deviating cutting teeth measured in the circumferential direction of the peeling wheel is greater than a first pitch. Such thick cutting teeth are also referred to in technical language as "block teeth" and can be shaped, in the case of a peeling wheel according to the invention, such that the respectively deviating cutting teeth of the peeling wheel together produce the index pockets to be reproduced on the gear wheel to be manufactured over the required circumferential length.

It may be provided that the position of a deviating cutting tooth of a peeling wheel according to the invention is shifted with respect to the first pitch in the rotational direction, in which the peeling wheel rotates about its peeling wheel rotational axis during the processing.

Similarly, the position of a deviating cutting tooth of a peeling wheel according to the invention can be shifted with respect to the first pitch counter to the rotational direction, in which the peeling wheel rotates about its peeling wheel rotational axis during the processing.

Preferably, a peeling wheel according to the invention comprises at least two deviating cutting teeth.

In the case of such an embodiment comprising at least two deviating cutting teeth, index pockets, which extend over a particularly large circumferential length of the gear wheel to be manufactured, can in particular be produced by the position of a deviating cutting tooth being shifted with respect to the first pitch in the rotational direction, in which the peeling wheel rotates about its peeling wheel rotational axis during processing, while the position of the other deviating cutting tooth of a peeling wheel according to the invention is shifted with respect to the first pitch counter to the rotational direction, in which the peeling wheel rotates about its peeling wheel rotational axis during processing. In the case of this embodiment of the invention, the tooth flank of the rear tooth, as seen in the rotational direction of the gear wheel to be toothed, which delimits the tooth gap or locking groove to be formed on the gear wheel in each case, is produced by the one deviating cutting tooth, whereas the flank of the front tooth, as seen in the rotational direction of the gear wheel to be toothed, which delimits the tooth gap or locking groove to be formed on the gear wheel in each case, is produced with the other deviating cutting tooth.

The type of separate production of the tooth flanks, which delimit the gaps of the gear wheel to be processed, which gaps are each to be reproduced by the deviating cutting teeth and which gaps are long with respect to the circumferential direction, made possible by a peeling wheel designed according to the invention has the advantage in terms of manufacturing technology that the material removal on the gear wheel blank to be processed is achieved with shorter chips and only on two surfaces of the teeth, which each delimit the large gap or locking groove to be reproduced on the gear wheel. Three-flank chips, which in conventional skiving are formed contiguously on the incoming flank, the root and the outgoing flank of the teeth, which delimit a tooth gap, of the toothing to be manufactured, can thus be avoided.

Typically, peeling wheels and methods according to the invention are used to produce internal toothings on ring- or tube-shaped gear wheel blanks, in particular for manufacture of sliding sleeves or the like for transmissions of motor vehicles. For the production of such internally toothed gear wheels by skiving, a peeling wheel, which is provided with an external toothing designed according to the invention, is particularly suitable. Thus, the invention enables the highly-efficient production of gear wheels, the dimensional and shape accuracy of which meets the highest requirements, without the need for special measures going beyond the invention.

BRIEF DESCRIPTION OF THE DRAWINGS

The invention is explained in more detail below by means of a drawing illustrating an exemplary embodiment.

FIG. 2 shows the peeling wheel according to FIG. 1a, 1b in a frontal view of its one front surface;

DESCRIPTION OF THE INVENTION

Figure 1A:
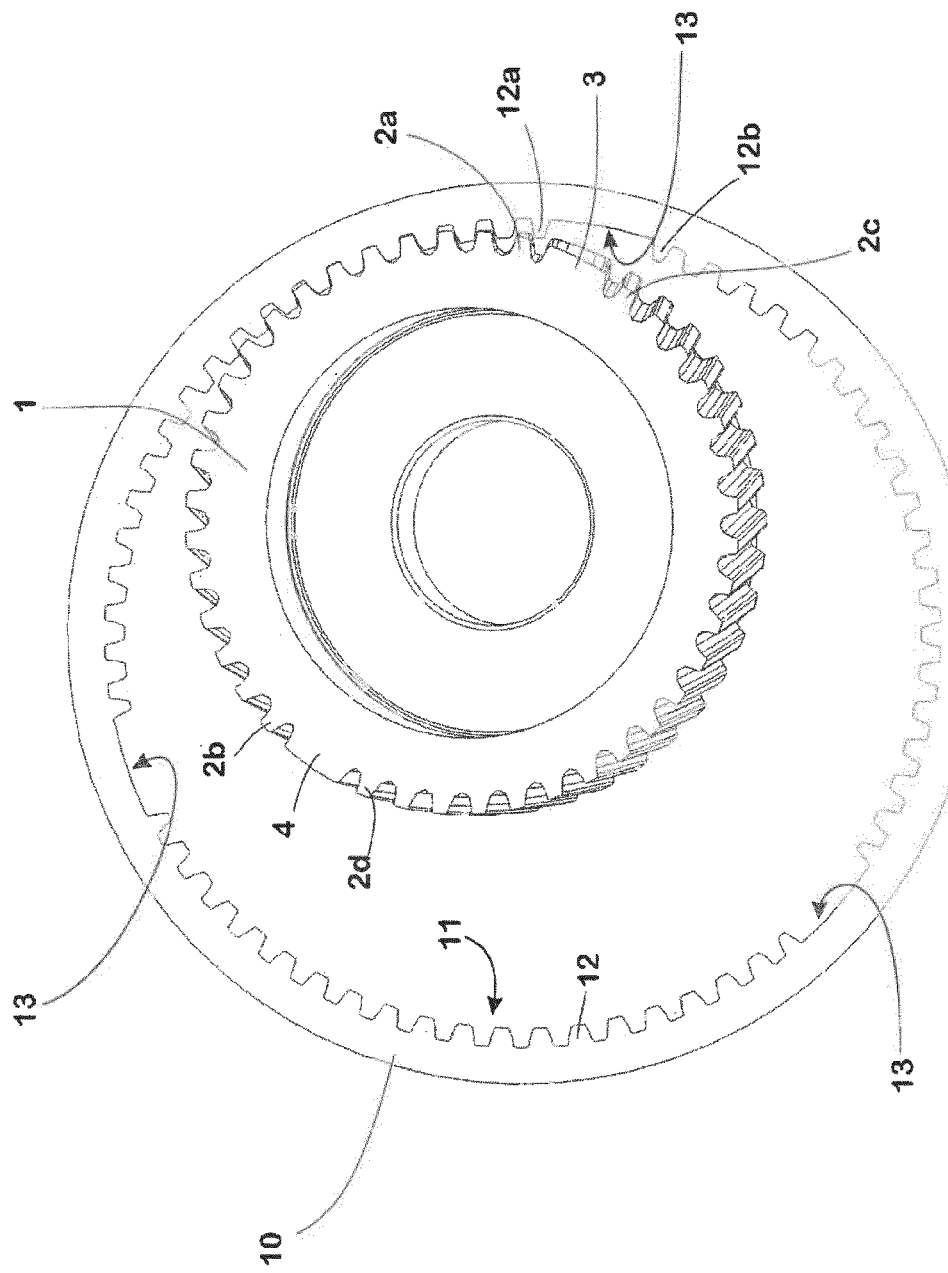
FIG. 1a shows a peeling wheel when producing an internal toothing on a gear wheel blank in a first perspective view.
Figure 1B:
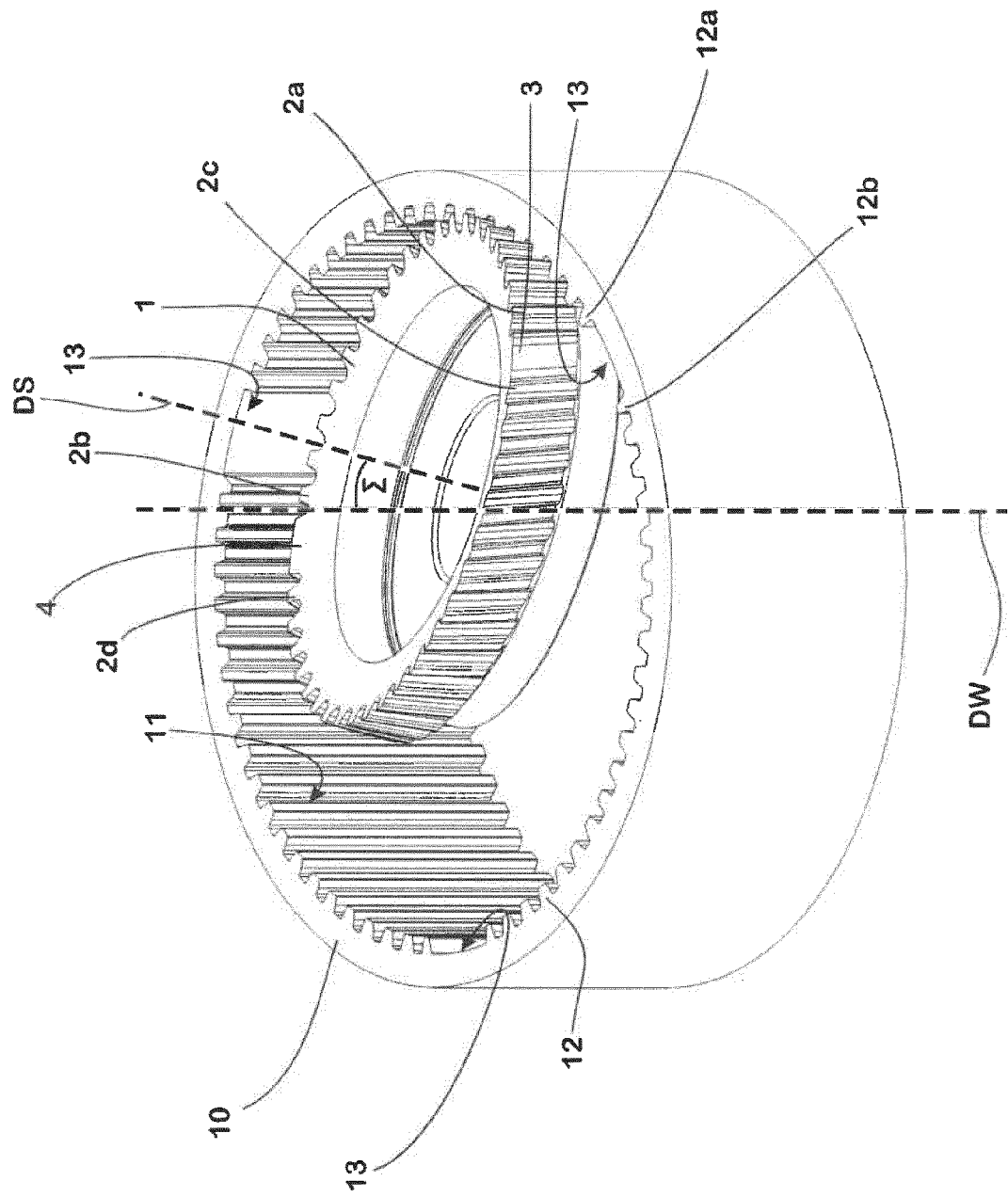
FIG. 1b shows the peeling wheel according to FIG. 1a when producing an internal toothing on the gear wheel blank in a second perspective view.

The peeling wheel 1 is held in a conventional manner on a tool spindle of a conventionally structured skiving machine not shown here and is driven in a rotating manner about a peeling wheel rotational axis DS.

In this case, the peeling wheel 1 comprises an external toothing which is formed from a plurality of equally shaped cutting teeth 2, 2a, 2b, 2c, 2d. The equally shaped cutting teeth 2, 2a, 2b, 2c, 2d are arranged at a regular pitch p distributed around the rotational axis DS on the outer circumference of the peeling wheel. The pitch p defined by the arrangement of the cutting teeth 2-2d selected in this way defines the "first pitch p of the peeling wheel 1".

In the region of half the circumference of the peeling wheel 1 in each case, a deviating cutting tooth 3, 4 extends in each case on opposite sides of the peeling wheel 1 in regions whose length measured in the circumferential direction U of the peeling wheel 1 extends beyond a pitch p. The thickness of the deviating cutting teeth 3, 4 each occupies a circumferential length which is greater than one pitch p. As such, the deviating cutting teeth 3, 4 form so-called "block teeth".

In this case, the one deviating cutting tooth 3 is positioned shifted out of the pitch p counter to the rotational direction D of the peeling wheel 1 in the direction of the equally shaped cutting tooth 2a next-adjacent to it such that the gap 5a between the tooth flank of the equally shaped cutting tooth 2a assigned to the deviating cutting tooth 3 and the tooth flank of the deviating cutting tooth 3 facing it is smaller than the gaps 6 present between the equally shaped cutting teeth 2, 2a, 2b, 2c, 2d next-adjacent to each other.

In a corresponding manner, the other deviating cutting tooth 4 is arranged shifted out of the pitch p in the rotational direction D of the peeling wheel 1 in the direction of the equally shaped cutting tooth 2b next-adjacent to it such that the gap 5b between the tooth flank of the equally shaped cutting tooth 2b assigned to this deviating cutting tooth 4 and the tooth flank of the deviating cutting tooth 4 facing it is smaller than the gaps 6 present between the equally shaped cutting teeth 2, 2a, 2b, 2c, 2d next-adjacent to each other.

For the manufacture of an internally-toothed gear wheel provided with index pockets, a gear wheel blank 10 pre-toothed in a conventional manner is provided and clamped on a workpiece spindle, also not represented here, of the skiving machine not represented. The workpiece spindle drives the gear wheel blank in a rotating manner about a workpiece rotational axis DW. In this case, the workpiece rotational axis DW and the peeling wheel rotational axis DS are aligned in space in a manner known per se for skiving such that they cross each other at an axis cross angle Y. In addition, a drive is provided also in a manner known per se with which the peeling wheel 1 and the gear wheel blank 10 can be adjusted relative to one another.

During skiving processing, the peeling wheel 1 rolls with its cutting teeth 2-2d, 3, 4 such that, with the cutters present on the cutting teeth 2-2d, 3, 4, material is removed in a chip removing manner from the flanks of the teeth 12, 12a, 12b of the internal toothing 11 of the gear wheel blank 10.

Figure 3:
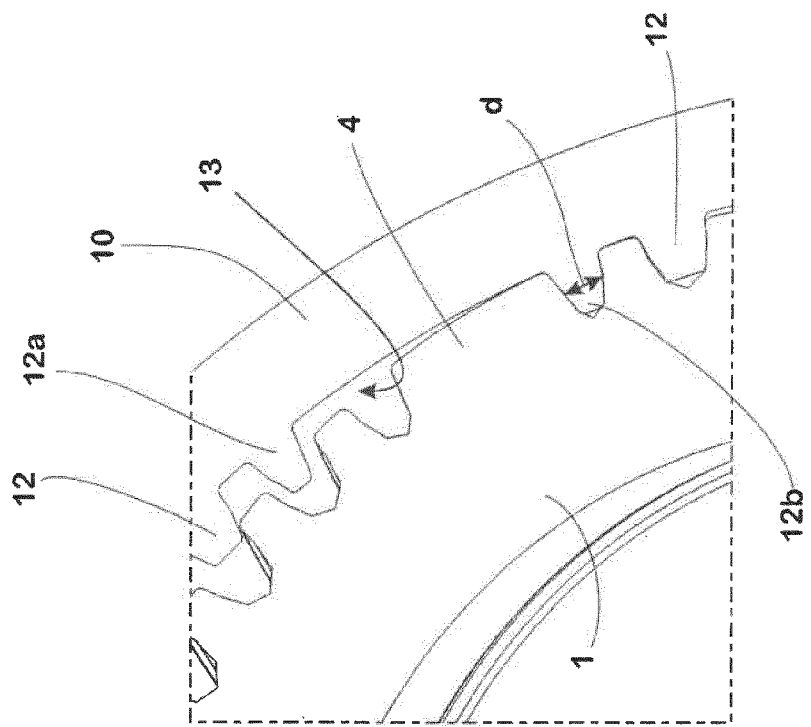
FIG. 3 shows the peeling wheel according to FIG. 1a, 1b in engagement with the toothing to be produced on the gear wheel blank in a first operating position.

As represented in FIG. 3, the first deviating cutting tooth 3 shifted with respect to the pitch p counter to the rotational direction D, due to its arrangement offset with respect to the pitch, only removes material on the tooth flank of that tooth 12a of the internal toothing 11, which delimits the locking groove 13 on its rear side with respect to the rotational direction D, which locking groove is to be manufactured on the gear wheel blank 11 in each case and is designed in the manner of a gap extending beyond a pitch p in the circumferential direction U in terms of its extension.

Figure 4:
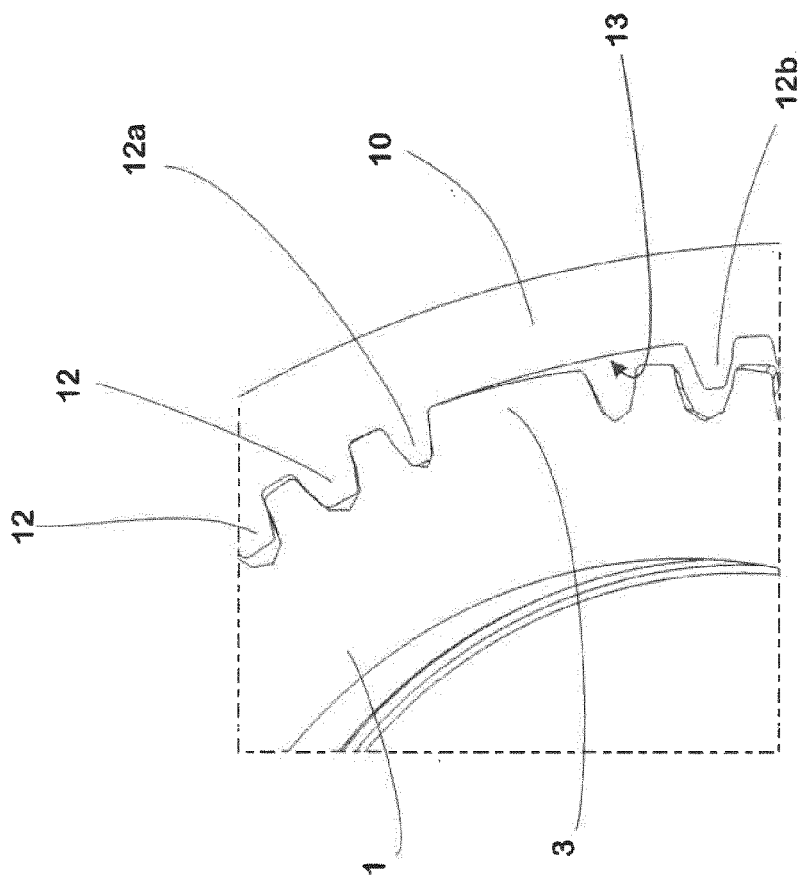
FIG. 4 shows the peeling wheel according to FIG. 1a, 1b in engagement with the toothing to be produced on the gear wheel blank in a second operating position.

In contrast, the deviating cutting tooth 4 pushed out of the pitch p in the direction of the rotational direction D, as shown in FIG. 4, exclusively removes material from the tooth flank of the tooth 12b assigned to the respective locking groove 13, which tooth delimits the respective locking groove 13 on its front side with respect to the rotational direction D. Due to the offset arrangement of the deviating cutting teeth 3, 4 and the resulting narrower gaps 5a, 5b of the peeling wheel 1 compared to the gaps 6 between the equally shaped cutting teeth, the teeth 12a, 12b of the gear wheel produced from the gear wheel blank 10, which teeth respectively delimit the index pockets 13, have a smaller thickness d than the teeth 12, which are formed by the equally shaped cutting teeth 2-2d of the peeling wheel 1 on the finished gear wheel.

REFERENCE NUMERALS 1 peeling wheel
2, 2a-2d equally shaped cutting teeth of the peeling wheel 1
3, 4 deviating cutting teeth of the peeling wheel 1
5a, 5b gap between the tooth flank assigned to the deviating cutting teeth 3, 4 and the respectively next-adjacent equally shaped cutting tooth 2a, 2b
6 gaps between the equally shaped cutting teeth 2, 2a, 2b, 2c, 2d next-adjacent to each other
10 gear wheel blank
11 pre-toothed internal toothing of the gear wheel blank 10
12, 12a, 12b teeth of the internal toothing of the gear wheel blank 10
13 index pockets (wide gap)
d thickness of the teeth 12a, 12b on the gear wheel completely formed from the gear wheel blank
D rotational direction of the peeling wheel 1
DS peeling wheel rotational axis
DW workpiece rotational axis
p first pitch of peeling wheel 1
U circumferential direction of the peeling wheel 1
Σ Axis cross angle

The invention claimed is:

1. A peeling wheel for manufacturing a gear wheel toothing on a gear wheel by skiving, wherein the peeling wheel comprises:
a toothing, which is formed by a plurality of identically shaped cutting teeth arranged and distributed around a rotational axis of the peeling wheel at a first pitch and by at least two deviating cutting teeth whose shape is different from the shape of plurality of identically shaped cutting teeth,
wherein each of the plurality of identically shaped cutting teeth comprises respective cutting edges which engage with material of the gear wheel during skiving,
wherein each of plurality of identically shaped cutting teeth has a respective center line extending through the center thereof with respect to a circumferential direction of the peeling wheel, and the first pitch corresponds to a distance between the respective center line of two adjacent cutting teeth of the plurality of identically shaped cutting teeth along the pitch circle of the peeling wheel,
wherein each of the at least two deviating cutting teeth is arranged outside of the first pitch, each of the at least two deviating cutting teeth having a respective center line extending through the center thereof with respect to the circumferential direction of the peeling wheel,
wherein a first of the at least two deviating cutting teeth is arranged outside of the first pitch such that the corresponding center line of the first of the at least two deviating cutting teeth is shifted out of the first pitch in a rotational direction of the peeling wheel, the rotational direction being a direction in which the peeling wheel rotates about the rotational axis of the peeling wheel during skiving, and
wherein a second of the at least two deviating cutting teeth is shifted outside of the first pitch such that the center line of the second of the at least two deviating cutting teeth is shifted out of the first pitch counter to the rotational direction of the peeling wheel.

2. The peeling wheel according to claim 1, wherein a thickness of each of the at least two deviating cutting teeth measured in the circumferential direction of the peeling wheel is greater than the first pitch.

3. A method for manufacturing a gear wheel toothing on a gear wheel by skiving with the peeling wheel according to claim 1, the method comprising:
providing the peeling wheel according to claim 1,
driving a gear wheel blank to be toothed in a rotating manner about a workpiece rotational axis and driving the peeling wheel in a rotating manner about the rotational axis of the peeling wheel, wherein the workpiece rotational axis and the rotational axis of the peeling wheel are aligned crossing each other at an axis cross angle, and wherein the peeling wheel is brought into engagement with the gear wheel blank such that the plurality of identically shaped cutting teeth and the at least two deviating cutting teeth of the peeling wheel remove material of the gear wheel blank.

4. The method according to claim 3, wherein the first of the at least two deviating teeth machines a tooth flank of a first tooth on the gear wheel blank to be toothed, wherein the second of the at least two deviating teeth machines a tooth flank of a second tooth on the gear wheel blank to be toothed, and wherein the first tooth and the second tooth on the gear wheel blank are separated from one another by a gap, which gap is to be formed on the gear wheel blank and which gap exceeds a tooth thickness of the peeling wheel with respect to the rotational direction.

* * * * *